UNITED STATES PATENT OFFICE.

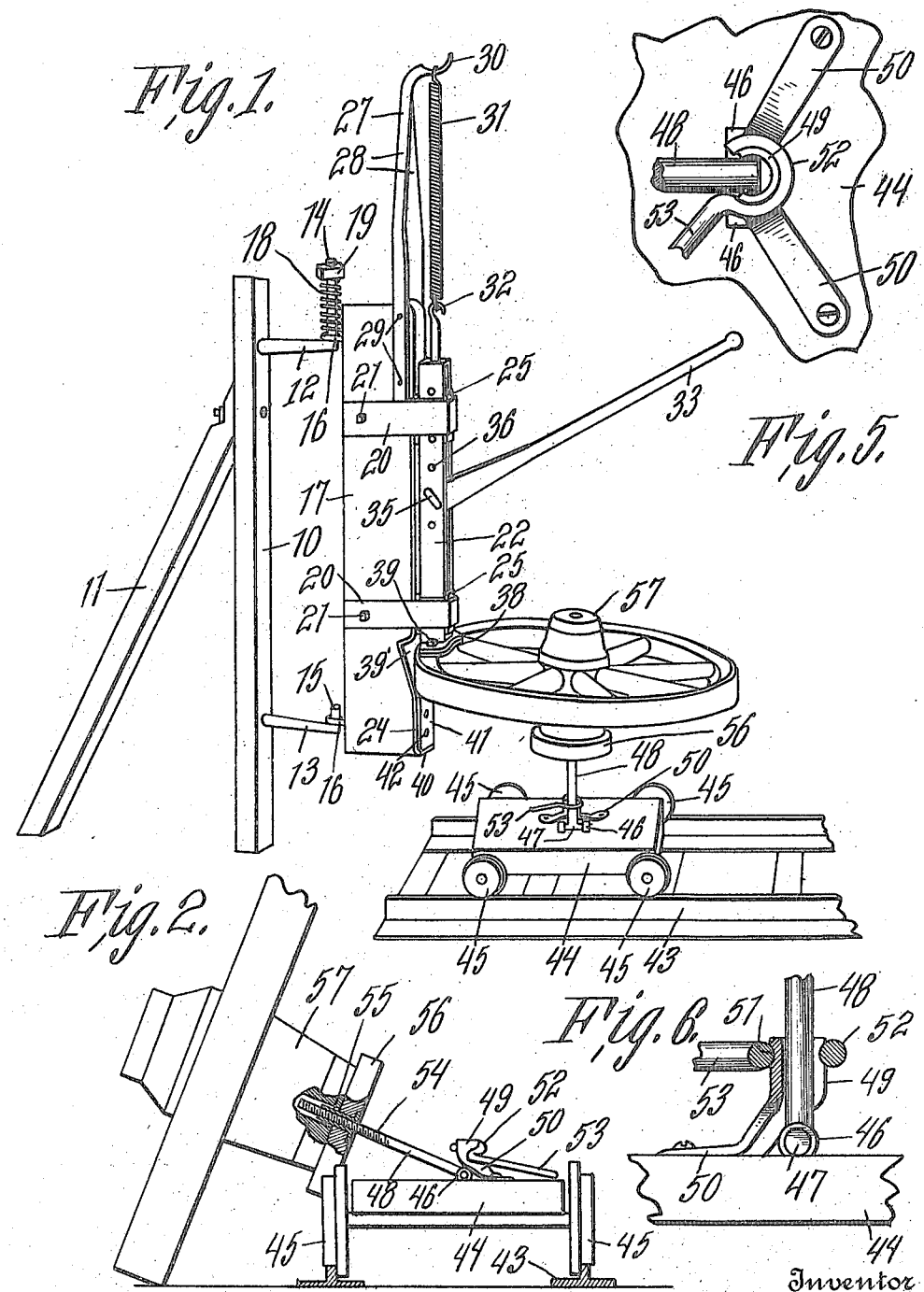

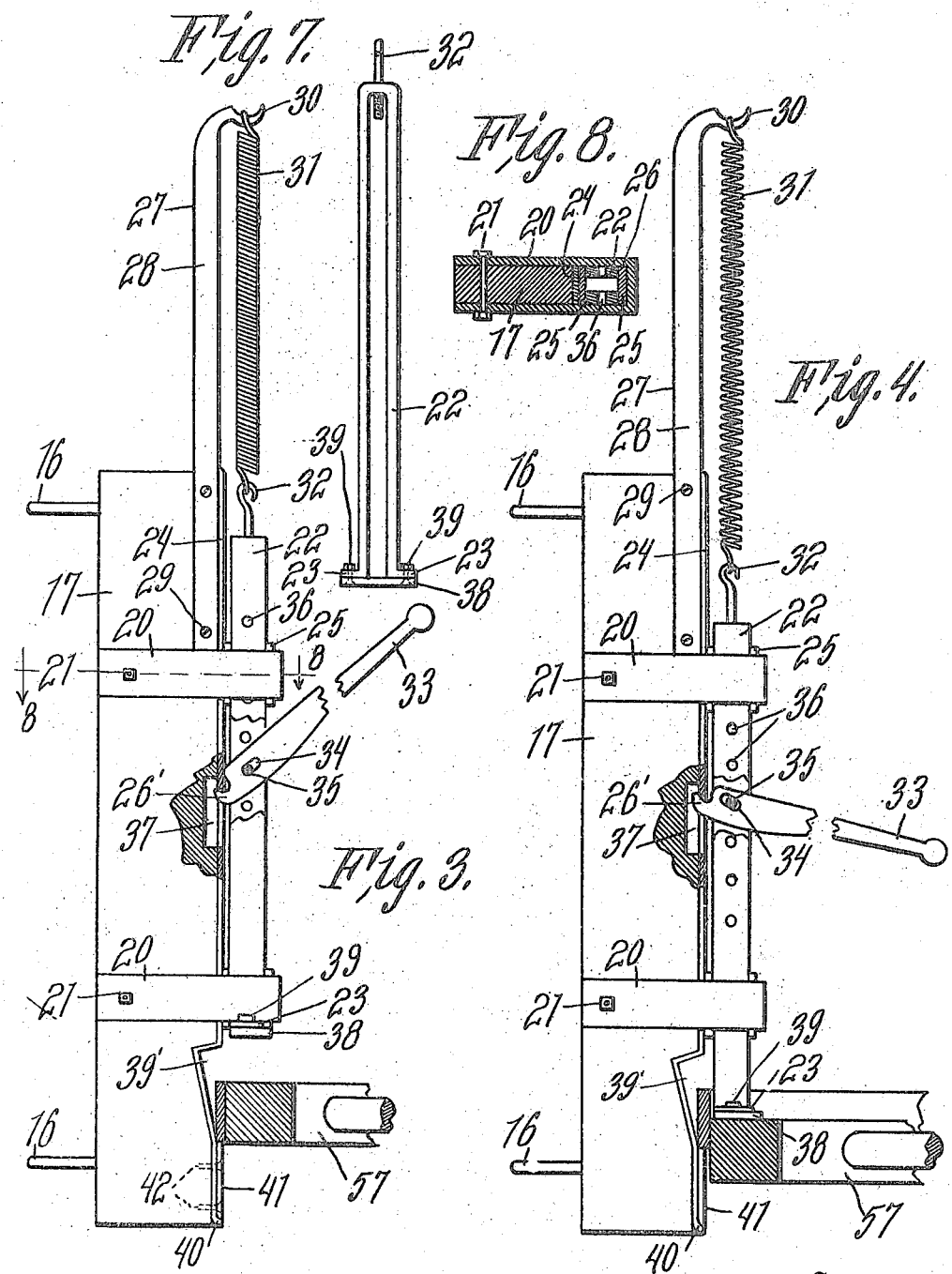

FLORAIR MARAK, OF HAZEN, ARKANSAS.

TIRE-REMOVER.

1,202,552.

Specification of Letters Patent.  Patented Oct. 24, 1916.

Application filed April 16, 1915. Serial No. 21,900.

*To all whom it may concern:*

Be it known that I, FLORAIR MARAK, a citizen of the United States, residing at Hazen, in the county of Prairie and State of Arkansas, have invented certain new and useful Improvements in Tire-Removers, of which the following is a specification.

My invention relates to improvements in machines for removing tires from wheels.

An important object of the invention is to provide a machine of the above mentioned character, which is simple in construction, inexpensive to manufacture, strong, durable and may be conveniently manipulated by a single operator.

Other objects and advantages of the invention will be apparent during the course of the following description.

In the accompanying drawings forming a part of this specification and in which like numerals are employed to designate like parts throughout the same, Figure 1 is a perspective view of a machine embodying my invention, Fig. 2 is an end elevation of the carriage with the wheel supporting member in the inclined position, Fig. 3 is a side elevation of the plunger and associated elements, with the plunger elevated, and parts shown in section for the purpose of illustration, Fig. 4 is a similar view with the plunger lowered, Fig. 5 is a plan view of the locking sleeve with the wheel supporting element in the inclined position, Fig. 6 is a detailed longitudinal section through a locking sleeve, Fig. 7 is a side elevation of the plunger removed, and, Fig. 8 is a horizontal section taken on line 8—8 of Fig. 7.

In the drawings, wherein for the purpose of illustration is shown a preferred embodiment of my invention, the numeral 10 designates a vertical support or beam, which may be suitably braced by a diagonal beam 11, as shown.

Rigidly connected with the support 10 near its upper and lower ends are hinged members 12 and 13, having upstanding portions 14 and 15 respectively. Pivotally mounted upon the upstanding portions 14 and 15 of the hinge elements are co-acting hinged members or eye-bolts 16, rigidly secured to one edge of a horizontally swinging support or bar 17, as shown. A compressible coil spring 18 surrounds the upstanding portion 14 and engages the upper eye-bolt 16 and a nut 19, thus yieldingly opposing the upward movement of the support or bar 17, while allowing it to be swung horizontally into and out of the operative position. When the machine is not in use, the support or bar 17 is swung laterally to occupy a position in the plane of the hinged members 12 and 13, to save space.

Rigidly mounted upon the support or bar 17 are substantially U-shaped horizontal guides or guide-strips 20 (see Fig. 8), attached thereto by means of the bolt 21 or the like, as shown. Mounted to reciprocate within the forward ends of the guides 20, which project outwardly beyond the support or bar 17, is a plunger 22, preferably formed of a strip or bar of metal bent into an inverted U-shaped form, and provided at its lower ends with outwardly extending flanges 23, as shown. The face or edge of the support or bar 17 adjacent the plunger 22, is covered with a metallic strip 24, secured thereto by means of screws, bolts or the like. Guide members 25 are arranged within the guides 20 upon opposite sides of the plunger 22, and are provided upon their opposite edges with recesses or notches 26 to receive proportions of the guides 20, whereby they are detachably held in place.

The numeral 27 designates a substantially vertical suspension arm, the lower end of which is preferably forked for providing spaced arms 28, straddling the upper end of the support or bar 17, and rigidly secured thereto by means of screws 29, bolts or the like. At its upper end the suspension arm 27 is provided with a laterally extending hook 30, adapted for engagement with a suitably stiff retractile coil spring 31, the lower end of which is secured to the upper hooked end of a bolt 32, having screw-threaded engagement with the upper end of the plunger 22, as shown. It is thus apparent that the spring 31 and associated elements serve to normally retain the plunger 22 elevated.

The numeral 33 designates a vertically swinging operating lever, provided at one end with a preferably elongated opening or slot 34, receiving a removable bolt or pivot element 35, adapted to be passed through a selected pair of apertures 36, extending longitudinally of the plunger 22 in spaced relation, as shown. The lever 33 is arranged within the plunger 22 and is provided near its pivot with an upwardly extending hook 26', adapted to operate within a recess or notch 37, formed in the support 17 and strip 24, the hook 26' being adapted to engage behind the top wall of the recess 37 formed in the strip 24.

The lower end of the plunger 22 is provided with outwardly extending flanges 23, as above stated, and a plunger plate or head 38 is secured thereto by means of bolts 39 or the like, as shown. Near the lower end of the support or bar 17 is a recess 39' the strip 24 conforming thereto, as shown. The extreme lower end of the strip 24 is bent laterally, providing a stop shoulder 40, engaged by a support member or strip 41, secured to the support or bar 17 by means of a screw 42 or the like, as shown. In order that the wheel to be repaired may be conveniently moved to and from proximity to the plunger 22, I provide a track 43, which leads thereto.

The numeral 44 designates a carriage, provided with wheels 45, traveling upon the track 43. Rigidly mounted upon the carriage 44 preferably centrally thereof, are hinged members or knuckles 46, pivotally receiving a transverse head 47, rigidly mounted upon the lower end of a normally vertical or upstanding shaft 48, which is adapted to be swung transversely of the carriage 44, as shown. When in a vertical position, the shaft 48 enters a vertical upstanding locking sleeve 49, one side of which is cut away, as shown. The locking sleeve 49 is provided with depending spaced attaching members or ears 50, bolted or otherwise rigidly attached to the carriage 44. The sleeve 49 is provided with a horizontal annular groove 51, receiving a circular head 52 of a lever 53, the head 52 being provided with an opening adapted for registration with the side opening of the sleeve 49. It is obvious that when the lever 53 is swung to the position with the opening of the head 52 in registration with the opening in the sleeve 44, the shaft 48 will be released, in order that the same may assume the inclined position. The upper end of the normally vertical shaft 48 is screw-threaded, as shown at 54, and has screw-threaded engagement with a sleeve or thimble 55, rigidly mounted in the central portion of a tray 56, adapted to receive the hub of a wheel 57 thereon with the sleeve 55 extending into the hub, as shown.

The operation of the apparatus is as follows: When the machine is being used to remove the rim from a light wheel, such wheel is placed in a horizontal position upon the tray 56, as is obvious. When a heavy weight wheel is being worked upon, the lever 53 is moved to bring the head 52 to a position for releasing the normally vertical shaft 48, which swings or may be swung to the inclined position, as shown. The wheel may now be rolled into proximity to the tray 56 and the sleeve 55 inserted within the hub and the hub placed upon the inclined tray 56. The tray 56 with the hub thereon may now be swung to the vertical position, and the lever 53 turned to lock the shaft 48 in the vertical position, within the sleeve 49. The carriage 44 may be pushed along the track 43, bringing the wheel into proximity to the plunger 22. The rim of the wheel is moved into the recess 29' and is placed upon the strip 41, and should the wheel need vertical adjustment for this purpose, the same is effected by rotating the tray 56, as the sleeve 55 has screw-threaded engagement with the shaft 48. When the wheel is in the position shown in Figs. 3 and 4, with the rim engaging the strip 41, the operating lever 33 is swung downwardly, forcing the plunger 22 downwardly and the head 38 into engagement with the felly of the wheel, moving it downwardly while the rim is held against downward movement, as shown. It is obvious that the wheel may be turned, and by swinging the lever 33 downwardly at intervals, the felly may be conveniently and quickly forced out of the rim. When it is necessary to extend the downward travel of the plunger, a second pin (not shown) and identical with the pin 35 is passed through the uppermost pair of apertures 36, beneath the upper guide 20 when the plunger 22 is in the lowermost position, and the pivot 35 removed. The pin 35, after the lever 33 is swung upwardly, is placed in the next uppermost pair of apertures 36, pivotally connecting the lever 33 with the plunger 22, at that point. It is obvious that the plunger 22 will now travel downwardly a greater distance, upon the downward movement of the lever 33. When the machine is not in use, the support 71 is swung laterally out of the way.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a machine of the character described; an upstanding support; hollow guide elements secured thereto; a plunger mounted to slide in the guide elements and formed of a strip of metal bent between its ends for providing an upper transverse portion and spaced sides depending therefrom and provided at their ends with flanges; a head secured to the flanges; an upstanding arm secured to the upper end of the support; a bolt attached to the upper transverse portion of the plunger; a retractile coil spring connecting the bolt and the upstanding arm; a lever extending between the sides of the plunger and adapted to engage a portion of the support; and means to pivotally connect the lever and sides.

2. In a machine of the character described; an upstanding support; hollow guide elements secured thereto; a plunger mounted to slide in the guide elements and formed of a strip of metal bent between its ends for providing an upper apertured transverse portion and spaced sides depending therefrom and having vertically spaced apertures and flanges at their lower ends; a head secured to the flanges; an upstanding arm secured to the upper end of the support; a bolt arranged in the aperture of the upper transverse portion of the plunger; a retractile coil spring connecting the bolt and the upper end of the arm; a lever extending between the sides of the plunger and provided with an aperture and adapted to engage a portion of the support; and a bolt adapted to be removably mounted within a selected pair of vertically spaced apertures of the sides and to pass through the aperture in the lever.

In testimony whereof I affix my signature in presence of two witnesses.

FLORAIR MARAK.

Witnesses:
EARLE BOWMAN,
H. A. HOUSTON.

Copies of this patent may be obtained for five cents each, by addressing the "Commissioner of Patents, Washington, D. C."